Dec. 13, 1960 J. W. WOOLCOCK 2,964,551
PRODUCTION OF UNSATURATED HYDROCARBONS AND METHANOL
Filed March 6, 1958
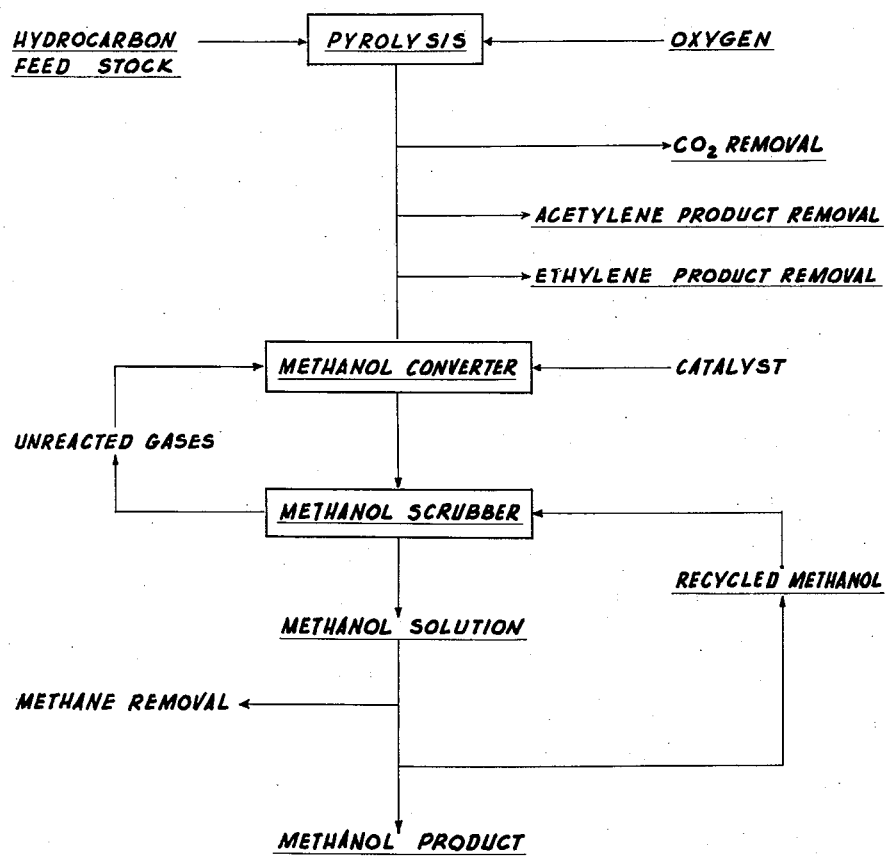
INVENTOR
JAMES WILLIAM WOOLCOCK
BY Cushman, Darby & Cushman
ATTORNEY United States Patent Office 2,964,551
Patented Dec. 13, 1960

2,964,551

PRODUCTION OF UNSATURATED HYDROCARBONS AND METHANOL

James William Woolcock, Norton-on-Tees, England, assignor to Imperial Chemical Industries Limited, London, England, a corporation of Great Britain Filed Mar. 6, 1958, Ser. No. 719,474

Claims priority, application Great Britain Mar. 27, 1957

14 Claims. (Cl. 260—449.5)

This invention relates to the production of unsaturated hydrocarbons and methanol.

It is already known to submit hydrocarbons to a partial oxidation process to produce gas mixtures containing acetylene, ethylene, hydrogen and carbon monoxide. It is also well-known to react together hydrogen and carbon monoxide to produce methanol. In the present process, these two steps are combined together in a manner such that the gas produced by the partial oxidation of the hydrocarbon has a composition which makes it suitable for methanol production. However, the gas mixture which leaves the methanol production step in an overall process of this type contains undesirable constituents, particularly methane. It is desirable to remove this methane before recirculating the gas mixture to the methanol production process, and it is a feature of the present invention that this is accomplished in a convenient and economical manner.

Thus, according to the present invention, there is provided a process which comprises the following steps: a liquid or gaseous hydrocarbon feedstock, a gas comprising hydrocarbons and/or hydrogen, and oxygen are subjected to reaction in one or more stages so that a temperature in excess of 1200° C. is attained whereby both cracking and combustion occur, the reaction being conducted under conditions and with proportions of starting materials such that the product comprises substantial amounts of acetylene, ethylene, methane, hydrogen, carbon monoxide and carbon dioxide, the hydrogen:carbon monoxide volume ratio being greater than 1:1; the product is treated successively for the removal of carbon dioxide, acetylene and ethylene; the residual gas comprising methane, hydrogen and carbon monoxide, the hydrogen:carbon monoxide volume ratio being greater than 1:1, is passed to a methanol converter in which substantial proportions of the hydrogen and carbon monoxide are converted catalytically under conditions of elevated temperature and pressure to methanol; the methanol produced is condensed and in part employed to scrub under elevated pressure unreacted gas leaving the methanol converter; the solution of methane in methanol so obtained is removed from the system and its pressure decreased, methane being liberated together with other dissolved gases.

The process of this invention is schematically illustrated by the flow sheet of the drawing.

Any light gaseous or liquid hydrocarbon may be used in the process of the present invention. For example, the hydrocarbon employed may be a fraction boiling within the range of 30° to 150° C. and having a density of the order of 0.7. A gas comprising hydrocarbons and/or hydrogen may be produced in a stage of the present invention and in consequence one of the gases fed to the initial reaction may be a gas recycled from another stage of the process, after suitable treatment.

The mixture of hydrocarbon feedstock and gas comprising hydrocarbons and/or hydrogen is preferably subjected to reaction with oxygen in one or more stages so that a temperature of the order of 1300 to 1500° C. is attained. Methane and carbon monoxide separated later in the present overall process may also be recycled to this reaction zone. In this reaction, it is desirable to use substantially pure oxygen; otherwise impurities, such as undesirable inert gases, for example, nitrogen and argon, are introduced into the apparatus. Even when using relatively pure oxygen, it is in general necessary to have a purge later in the overall process to prevent a build-up of inert gases in the system. The reaction with oxygen is preferably carried out at substantially atmospheric pressure. Preferably, the composition of the reaction mixture and the conditions are arranged so that the exit gas from the reaction with oxygen has a hydrogen:carbon monoxide volume ratio of about 2:1.

This gas mixture is preferably freed from carbon dioxide, for example, by washing with aqueous ammonia. Acetylene is then removed by any convenient method: it may, for example, be stripped from the gas mixture produced by treating it with liquid ammonia at a temperature of the order of −70° C.

At this stage ethylene is removed from the gas mixture in any convenient manner; thus the pressure of the gas mixture may be increased to a moderately elevated pressure, for example 30 atmospheres, and the ethylene may then be removed from the pressurized gas mixture by absorption in a suitable solvent, such as, for example, in a $C_5$–$C_6$ naphtha at a temperature of about −20° C.

The gas remaining after the ethylene removal process may be fed to the methanol converter, together with gas recirculated from the converter, without substantial change of quantity or composition. On the other hand, a portion of the gas may be withdrawn and used in various manners. For example, a portion of the gas may be removed and used as fuel gas, for instance for pre-heating reactants to be used in the process. Again, a portion of the gas may be submitted to reaction with steam at a temperature of the order of 400 to 500° C. in the presence of a catalyst comprising iron so that its carbon monoxide content is largely converted to hydrogen and carbon dioxide. The carbon dioxide is removed and if desired the hydrogen-rich gas may be recycled to the initial reaction zone. On the other hand, part or all of this hydrogen-rich gas may be admixed with the gas stream which is being passed to the methanol converter, particularly if the gas otherwise being fed to this zone has a hydrogen:carbon monoxide molar ratio of less than 2:1.

The pressure of the gas mixture fed to the methanol converter should be increased preferably to the order of 200 to 400 atmospheres. The gas mixture is preferably passed through activated carbon containers or other suitable equipment, to remove any naphtha vapours which have been carried forward, before entering the methanol converter.

The gas mixture comprising carbon monoxide, hydrogen and methane is then introduced into a methanol converter, that is a reaction vessel in which the carbon monoxide and hydrogen are converted in part at least to methanol.

It is desirable to work in this converter at a relatively low conversion per pass; for example, 25 to 50% of the carbon monoxide is converted per pass to methanol, and in this case a substantial proportion of the gases are in general recycled to the reaction vessel. When operating in this manner using recycle, substantially all of the carbon monoxide may be converted to methanol. The conversion may be effected using, for example, a catalyst comprising zinc oxide and an oxide of chromium and in this case the conversion is suitably carried out at a temperature of 300° to 450° C.

The product leaving the methanol converter is scrubbed with methanol. The use of methanol scrubbing provides a selective process for the removal of waste gas, and in particular methane, while keeping the loss of carbon monoxide and hydrogen to a minimum. The methanol solution is then passed to a vessel in which its pressure is decreased to atmospheric, whereby gas escapes from the methanol which contains a substantial amount of methane, some of which has been carried through into the methanol converter from earlier stages of the reaction and some of which has been produced in the methanol converter. The gas mixture liberated in this manner may be employed as fuel gas. Part of the methanol produced is withdrawn from the system and submitted to purification; the remainder is pumped back into the apparatus and used for scrubbing gases coming from the methanol converter.

Alternatively, the methanol-containing product leaving the methanol converter is passed to a catch-pot maintained under a high pressure. Liquid methanol from this catch-pot is then let down into a catch-pot at an intermediate pressure of, for example, 100 atmospheres. In this manner of operation, there is liberated a gas containing small amounts of inert gases, for example nitrogen and argon, which have inevitably been introduced into the system, and also containing substantial amounts of carbon monoxide, hydrogen and methane. This gas may be used, for example, for heating purposes or for any other purpose. The methanol from the catchpot maintained at an intermediate pressure is now let down into a vessel at atmospheric pressure and the gas producer, which contains a high proportion of methane, may, as already disclosed, be fed back into the first stage of the process. Some of the methanol is withdrawn from the atmospheric pressure catchpot; the remainder is pumped back into the apparatus and used for scrubbing gases which have come from the methanol-synthesis zone. This scrubbing may take place at any suitable point. Gas remaining after this methanol scrubbing is recycled to the methanol converter.

Although the feature of the present invention in which unreacted gases are scrubbed with some of the methanol produced is a necessary feature of the process disclosed above, it may also be employed in modified processes. For example, the process could be carried out in a manner and under conditions such that the initial reaction is operated at a higher temperature, whereby a markedly smaller amount of ethylene is formed. Even in such a process, however, the feature of scrubbing the gas leaving the methanol converter with some of the methanol formed is still of value.

*Example*

To a pyrolysis zone maintained at a temperature of about 1300° C. the following materials were passed per hour:

(a) 5.45 tons of a light naphtha, boiling above 30° C. This feedstock was a cut from a straight-run Middle East crude oil, having an end-point of 145 to 150° C.
(b) 244.2 lb. moles of oxygen having a purity of 99.5%.
(c) 245.0 lb. moles of a combustion gas, produced as hereinafter described, comprising as major constituents: $H_2$—211 lb. moles; methane—121.7 lb. moles.

From the pyrolysis zone, 1086.4 lb. moles of gas were obtained per hour, the major constituents being: $CO_2$—48.7 lb. moles; $H_2$—436 lb. moles; CO—240 lb. moles; $CH_4$—80.6 lb. moles; $C_2H_2$—81.9 lb. moles; $C_2H_4$—160.9 lb. moles. Carbon dioxide was removed from the gas mixture by the use of aqueous ammonia. Small quantities of hydrocarbons removed at the same time were separated from the wash liquor and fed to a fuel gas stream which was used for pre-heating the reactants. Substantially pure acetylene was separated by the use of liquid ammonia at a temperature of −70° C. and the residual gas (947.2 lb. moles) now contained as major constituents: $H_2$—436 lb. moles; CO—240 lb. moles; $CH_4$—80.0 lb. moles; $C_2H_4$—158.5 lb. moles. The pressure of the gas was now increased to 27 atmospheres and it was subjected to the removal of ethylene by treatment at −20° C. with $C_5$—$C_6$ naphthas. In this process 150.0 lb. moles of pure ethylene were obtained; in addition small quantities of hydrogen, carbon monoxide and methane were separated and were added to the fuel gas stream already mentioned. In each hour, 713.2 lb. moles of gas passed out of the ethylene separation step. This gas had as major constituents: $H_2$—430 lb. moles; CO—205 lb. moles; $CH_4$—61.0 lb. moles. This gas was divided into two streams, one of which was passed without substantial alteration of composition to the methanol conversion system, while the second stream was passed to a zone in which part of it was reacted with steam. This second stream was actually divided into two portions. One of these was led directly into the fuel gas stream; it amounted to 130.8 lb. moles and has as major constituents: $H_2$—79 lb. moles; CO—37 lb. moles; $CH_4$—11.6 lb. moles. The remaining portion of the second stream which amounted to 244.5 lb. moles and had as major constituents: $H_2$—147 lb. moles; CO—70.5 lb. moles; $CH_4$—21.7 lb. moles, was reacted with steam at 400° C. in the presence of a catalyst comprising iron. By these means the carbon monoxide was largely converted by reaction with steam to hydrogen together with carbon dioxide, and the gas produced, after the removal of carbon dioxide, was used as the combustion gas in the first stage of the process.

Returning to the gas which was passed to the methanol conversion system, this amounted to 338 lb. moles and contained: $H_2$—204 lb. moles; CO—97.4 lb. moles; $CH_4$—27.7 lb. moles. It was compressed to a pressure of 300 atmospheres and passed through vessels containing activated carbon whereby any residual naphtha vapours were substantially removed. The gas was added to methanol synthesis gas already circulating in the methanol conversion zone. This gas mixture was contacted with a catalyst comprising oxides of zinc and chromium, maintained at a temperature of 350°–400° C. After cooling, the product was scrubbed with methanol and the residual gas mixture was recycled to the methanol conversion zone. This residual gas contained some 24% of methane.

The methanol used in this stage for scrubbing gases leaving the methanol converter was passed to a flash pot in which the pressure was released. A gas was produced which contained 32% by volume of hydrogen, 9% by volume of carbon monoxide and 45% by volume of methane. This was added to the fuel gas. Part of the methanol from the flash pot was recycled for use in the methanol scrubber mentioned above. The remainder of the methanol was withdrawn from the system. The amount of methanol made was 1.25 tons per hour of a liquid containing 95% by weight of methanol.

What is claimed is:
1. A process for the production of unsaturated hydrocarbons and methanol which comprises the steps of (1) subjecting a feedstock of a mixture of hydrocarbons, and hydrogen and oxygen to reaction at a temperature in excess of 1200° C. to form a reaction product containing substantial amounts of acetylene, ethylene, methane, hydrogen, carbon monoxide, and carbon dioxide wherein the hydrocarbon:carbon monoxide volume ratio is greater than 1:1; (2) treating this said reaction product to remove successively carbon dioxide, acetylene and ethylene, to form a residual gas mixture containing methane, hydrogen, and carbon monoxide, wherein the hydrogen:carbon monoxide volume ratio is greater than 1:1; (3) passing this said residual gas mixture to a methanol converter to catalytically convert a substantial amount of the hydrogen and carbon monoxide to methanol; (4) condensing the methanol thereby produced and scrub- bing under elevated pressure unreacted gases removed from the said methanol converter with recycled product methanol to form a solution of methane gas in methanol; (5) removing said solution from the system, decreasing the pressure thereon, and liberating the methane therefrom, and (6) recycling product methanol to step (4), and (7) recycling the scrubbed unreacted gases from step (4) to the methanol converter in step (3).

2. A process as claimed in claim 1, in which the hydrocarbon feedstock is a fraction boiling within the range of 30° C. to 150° C. and having a density of the order of 0.7.

3. A process as claimed in claim 1, in which the reaction of step (1) is in the presence of substantially pure oxygen and is carried out at a temperature of the order of 1300 to 1500° C. and at substantially atmospheric pressure.

4. A process as claimed in claim 1 in which the said reaction product from step (1) has a hydrogen-carbon monoxide volume ratio of about 2:1.

5. A process as claimed in claim 1, in which the said reaction product from step (1) is freed from carbon dioxide in step (2) by washing with aqueous ammonia and is thereafter treated with liquid ammonia at a temperature of the order of −70° C. for the removal of acetylene.

6. A process as claimed in claim 5, in which the gas mixture after removal of acetylene in step (2) is subjected to an increase in pressure of the order of 30 atmospheres, and ethylene is then removed therefrom by absorption in a mixture of $C_5$ and $C_6$ naphthas maintained at a temperature of the order of −20° C.

7. A process as claimed in claim 1, in which the said residual gas mixture from step (2) is fed to the methanol converter of step (3) together with gas re-circulated from the product from said converter.

8. A process as claimed in claim 1, in which said residual gas mixture from step (2) prior to introducing it into the methanol converter in step (3) is subjected to increased pressure of the order of 200 to 400 atmospheres and is then passed through activated carbon containers to remove any naphtha vapors which have been carried forward from step (2).

9. A process as claimed in claim 1, wherein the methanol solution in step (5) is passed to a vessel maintained at a pressure of the order of 100 atmospheres, the gas thereby liberated is used as fuel gas, the resulting methanol solution is passed to a vessel at atmospheric pressure, and the gas thereby liberated fed back to the first stage of the process.

10. A process for the production of unsaturated hydrocarbons and methanol which comprises the steps of (1) subjecting a feedstock consisting substantially of methane, and hydrogen and oxygen to reaction at a temperature in excess of 1200° C. to form a reaction product containing substantial amounts of acetylene, methane, hydrogen, carbon monoxide, and carbon dioxide wherein the methane:carbon monoxide volume ratio is greater than 1:1; (2) treating this said reaction product to remove successively carbon dioxide and acetylene, to form a residual gas mixture containing unreacted methane, hydrogen, and carbon monoxide, wherein the hydrogen:carbon monoxide volume ratio is greater than 1:1; (3) passing this said residual gas mixture to a methanol converter to catalytically convert a substantial amount of the hydrogen and carbon monoxide to methanol; (4) condensing the methanol thereby produced and scrubbing under elevated pressure unreacted gases removed from the said methanol converter with said methanol to form a solution of methane gas in methanol; (5) removing said solution from the system, decreasing the pressure thereon, and liberating the methane therefrom, and (6) recycling said methane from step (5) to step (1).

11. A process for the production of unsaturated hydrocarbons and methanol which comprises the steps of (1) subjecting a feedstock of at least one hydrocarbon and free from methane, and hydrogen and oxygen to reaction at a temperature in excess of 1200° C. to form a reaction product containing substantial amounts of acetylene, ethylene, methane, hydrogen, carbon monoxide, and carbon dioxide wherein the hydrocarbon:carbon monoxide volume ratio is greater than 1:1; (2) treating this said reaction product to remove successively carbon dioxide, acetylene and ethylene, to form a residual gas mixture containing methane, hydrogen, and carbon monoxide, wherein the hydrogen:carbon monoxide volume ratio is greater than 1:1; (3) passing this said residual gas mixture to a methanol converter to catalytically convert a substantial amount of the hydrogen and carbon monoxide to methanol; (4) condensing the methanol thereby produced and scrubbing under elevated pressure unreacted gases removed from the said methanol converter with said methanol to form a solution of methane gas in methanol; (5) removing said solution from the system, decreasing the pressure thereon, and liberating the methane therefrom.

12. A process for the production of unsaturated hydrocarbons and methanol which comprises the steps of (1) subjecting a feedstock of a mixture of hydrocarbons, and hydrogen and oxygen to reaction at a temperature in excess of 1200° C. to form a reaction product containing substantial amounts of acetylene, ethylene, methane, hydrogen, carbon monoxide, and carbon dioxide wherein the hydrocarbon:carbon monoxide volume ratio is greater than 1:1; (2) treating this said reaction product to remove successively carbon dioxide, acetylene and ethylene, to form a residual gas mixture containing methane, hydrogen, and carbon monoxide, wherein the hydrogen-carbon monoxide volume ratio is greater than 1:1; (3) passing this said residual gas mixture to a methanol converter to catalytically convert a substantial amount of the hydrogen and carbon monoxide to methanol; (4) condensing the methanol thereby produced and scrubbing under elevated pressure unreacted gases removed from the said methanol converter with recycling product methanol to form a solution of methane gas in methanol; (5) removing said solution from the system, decreasing the pressure thereon, and liberating the methane therefrom, and (6) recycling product methanol to step (4), and (7) recycling the scrubbed unreacted gases from step (4) to the methanol converter in step (3); and (8) submitting a portion of the said residual gas mixture from step (2) in a separate step to reaction with steam at a temperature of the order of 400 to 500° C. in the presence of a catalyst comprising iron, to convert its carbon monoxide content largely to carbon dioxide, and to form hydrogen gas, and recycling said hydrogen gas to the initial reaction zone of step (1).

13. A process for the production of unsaturated hydrocarbons and methanol which comprises the steps of (1) subjecting a feedstock of a mixture of hydrocarbons, and hydrogen and oxygen to reaction at a temperature in excess of 1200° C. to form a reaction product containing substantial amounts of acetylene, ethylene, methane, hydrogen, carbon monoxide, and carbon dioxide wherein the hydrocarbon:carbon monoxide volume ratio is greater than 1:1; (2) treating this said reaction product to remove successively carbon dioxide, acetylene and ethylene, to form a residual gas mixture containing methane, hydrogen, and carbon monoxide, wherein the hydrogen:carbon monoxide volume ratio is greater than 1:1; (3) passing this said residual gas mixture to a methanol converter to catalytically convert a substantial amount of the hydrogen and carbon monoxide to methanol; (4) condensing the methanol thereby produced and scrubbing under elevated pressure unreacted gases removed from the said methanol converter with recycled product methanol to form a solution of methane gas in methanol; (5) removing said solution from the system, decreasing the pressure thereon, and liberating the methane therefrom, and (6) recycling product methanol to step (4), and (7) recycling the scrubbed methanol unreacted gases from step (4) to the methanol converter in step (3), and (8) submitting a portion of the said residual gas mixture from step (2) to reaction with steam at a temperature of the order of 400 to 500° C. in the presence of a catalyst comprising iron, to convert its carbon monoxide content largely to carbon dioxide, and to form hydrogen gas, and passing said hydrogen gas to said methanol converter to increase the hydrogen:carbon monoxide ratio in step (3).

14. A process for the production of unsaturated hydrocarbons and methanol which comprises the steps of (1) subjecting a feedstock of a mixture of hydrocarbons, and hydrogen, and oxygen to reaction at a temperature in excess of 1200° C. to form a reaction product containing substantial amounts of acetylene, ethylene, methane, hydrogen, carbon monoxide, and carbon dioxide wherein the hydrocarbon:carbon monoxide volume ratio is greater than 1:1; (2) treating this said reaction product to remove successively carbon dioxide, acetylene and ethylene, to form a residual gas mixture containing methane, hydrogen, and carbon monoxide, wherein the hydrogen:carbon monoxide volume ratio is greater than 1:1; (3) passing this said residual gas mixture to a methanol converter to catalytically convert a substantial amount of the hydrogen and carbon monoxide to methanol; in the presence of a catalyst comprising zinc oxide, and an oxide of chromium, and this conversion is carried out at a temperature of 300° to 450° C. and at a pressure of 300 to 400 atmospheres, at a pass conversion of from 25 to 50% of the carbon monoxide; (4) condensing the methanol thereby produced and scrubbing under elevated pressure unreacted gases removed from the said methanol converted with recycled product methanol to form a solution of methane gas in methanol; (5) removing said solution from the system, decreasing the pressure thereon, and liberating the methane therefrom, and (6) recycling product methanol to step (4), and (7) recycling the scrubbed unreacted gases from step (4) to the methanol converter in step (3).

References Cited in the file of this patent

UNITED STATES PATENTS

| | | |
|---|---|---|
| 1,625,925 | Woodruff et al. | Apr. 26, 1927 |
| 1,754,371 | Stengel | June 24, 1930 |
| 1,766,763 | Pier et al. | June 24, 1930 |
| 2,274,064 | Howard et al. | Feb. 24, 1942 |
| 2,464,532 | Sellers | Mar. 15, 1949 |